United States Patent
Wang et al.

(10) Patent No.: US 7,271,973 B2
(45) Date of Patent: Sep. 18, 2007

(54) FLYING HEIGHT COMPENSATION FOR UP/DOWN BIT ERROR RATE TREND DIFFERENCE

(75) Inventors: Geng Wang, San Jose, CA (US); Sang Lee, Pleasanton, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 377 days.

(21) Appl. No.: 10/933,774

(22) Filed: Sep. 2, 2004

(65) Prior Publication Data

US 2006/0044692 A1   Mar. 2, 2006

(51) Int. Cl.
*G11B 20/02* (2006.01)
*G11B 27/36* (2006.01)
*G11B 5/60* (2006.01)

(52) U.S. Cl. .............. 360/75; 360/235.5; 360/236.1; 360/236.3; 360/103

(58) Field of Classification Search ............. 360/235.5, 360/75, 236.1, 236.3, 103
See application file for complete search history.

(56) References Cited

U.S. PATENT DOCUMENTS

| | | | | |
|---|---|---|---|---|
| 5,687,042 A | * | 11/1997 | Chhabra et al. | 360/234.6 |
| 6,130,807 A | * | 10/2000 | Marchon | 360/135 |
| 6,466,409 B1 | * | 10/2002 | Baba et al. | 360/236.3 |
| 6,477,013 B1 | * | 11/2002 | Kang et al. | 360/236.3 |
| 6,700,727 B1 | * | 3/2004 | Crane et al. | 360/75 |
| 2002/0035778 A1 | * | 3/2002 | Hashimoto et al. | 29/603.09 |
| 2002/0071196 A1 | * | 6/2002 | Chapin et al. | 360/75 |

* cited by examiner

*Primary Examiner*—Andrea Wellington
*Assistant Examiner*—Matthew G. Kayrish
(74) *Attorney, Agent, or Firm*—Ben J. Yorks; Irell & Manella LLP

(57) ABSTRACT

A disk drive that has a plurality of heads coupled to one or more disks. The heads have air bearing surfaces that compensate for a radial crown and a radial camber of an adjacent disk to maintain a flying height at a relatively constant level across the disk surface. By way of example, the air bearing surfaces may have crown and camber sensitivities that are opposite in sign from the crown and camber sensitivities created by the disk. The opposite sensitivities offset the sensitivities of the disk to maintain an essentially constant flying height as the head moves across the surface of a disk.

10 Claims, 4 Drawing Sheets

FLYING HEIGHT COMPENSATION FOR UP/DOWN BIT ERROR RATE TREND DIFFERENCE

BACKGROUND OF THE INVENTION

1. Field of the Invention

The present invention relates to a head of a disk drive that compensates for a radial crown and radial camber of a disk to maintain a constant flying height across the surface of the disk.

2. Background Information

Hard disk drives contain a plurality of magnetic heads that are coupled to rotating disks. The heads write and read information by magnetizing and sensing the magnetic fields of the disk surfaces, respectively. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks. There are typically heads adjacent to the top surfaces of the disks, also referred to as the UP heads, and heads adjacent to the bottom surfaces of the disks, also known as DN heads.

The disks are rotated by a spindle motor of the drive. Rotation of the disks creates an air flow within the disk drive. Each head has an air bearing surface that cooperates with the air flow to create an air bearing between the head and the disk. The air bearing eliminates or minimizes the mechanical wear between the head and the disk. The height of the air bearing is commonly referred to as the flying height of the head.

Because of manufacturing defects a disk may have a radial slope also known as disk crown and radial curvature also known as disk camber. The crown and camber of a disk may vary the flying height of the air bearing as the head moves radially across the disk surface. The variation in flying height may produce errors in writing or reading data. The crown and camber of the disk increases the flying height for the UP head and decreases the flying height for the DN heads. It would be desirable to provide heads that compensate for the crown and camber of a disk. This UP/DOWN trend difference can make it difficult to compensate for the variations in flying height when writing and reading data.

BRIEF SUMMARY OF THE INVENTION

A hard disk drive with a head coupled to a disk. The disk has a radial crown and a radial camber. The head has an air bearing surface that creates an air bearing with a flying height. The air bearing surface compensates for the radial crown and radial camber to maintain the flying height across the surface of the disk.

DETAILED DESCRIPTION

Disclosed is a disk drive that has a plurality of heads coupled to one or more disks. The heads have air bearing surfaces that compensate for a radial crown and a radial camber of an adjacent disk to maintain a flying height at a relatively constant level across the disk surface. By way of example, the air bearing surfaces may have crown and camber sensitivities that are opposite in sign from the crown and camber sensitivities created by the disk. The opposite sensitivities offset the sensitivities of the disk to maintain an essentially constant flying height as the head moves across the surface of a disk.

Figure 1:
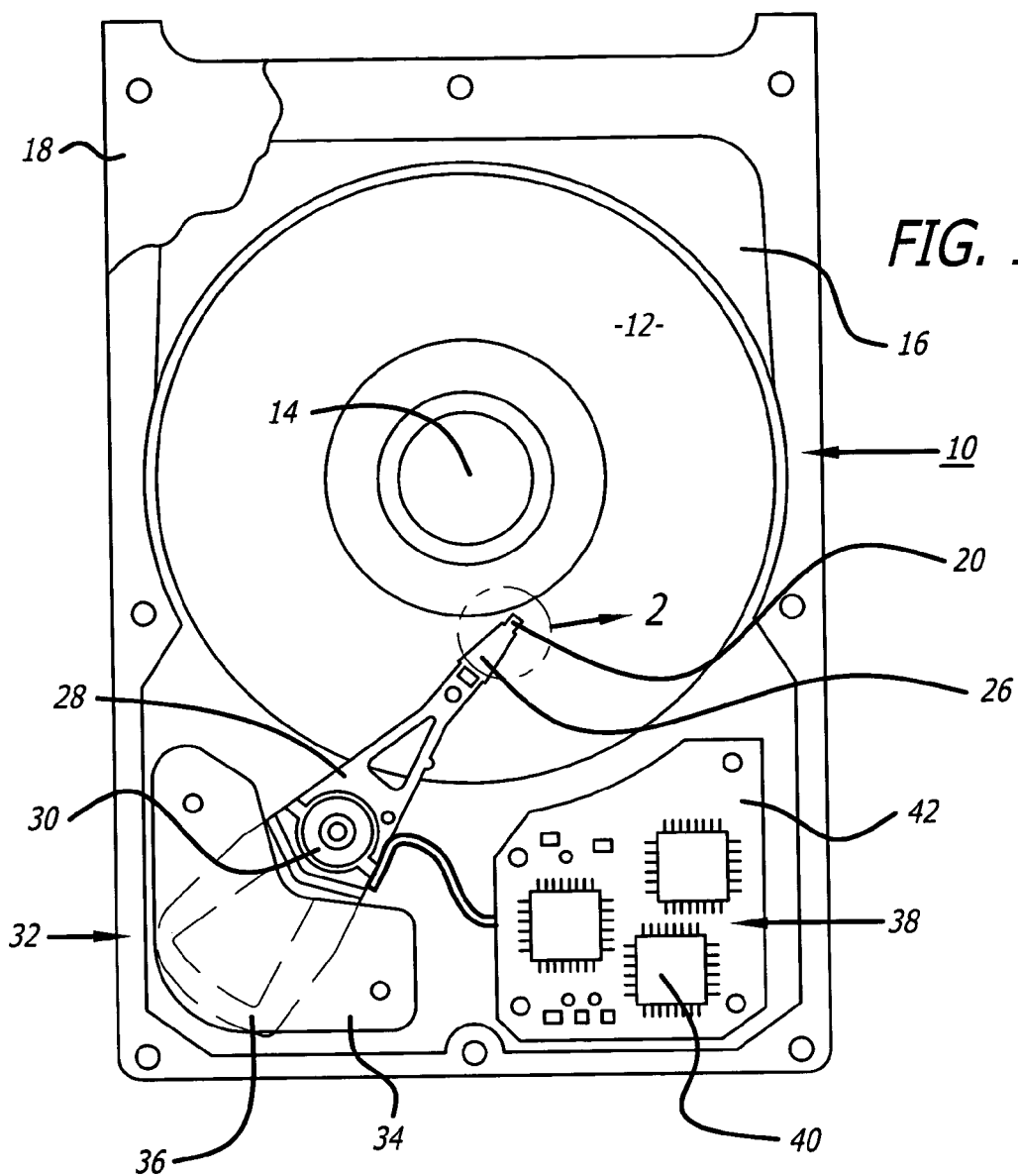
FIG. 1 is a top view of an embodiment of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2:
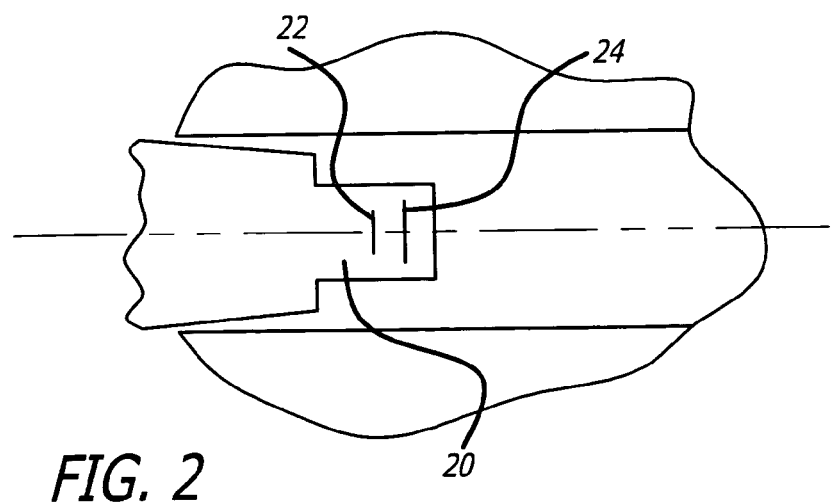
FIG. 2 is a top enlarged view of a head of the hard disk drive.

The disk drive 10 may include a plurality of heads 20 located adjacent to the disks 12. As shown in FIG. 2 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 3:
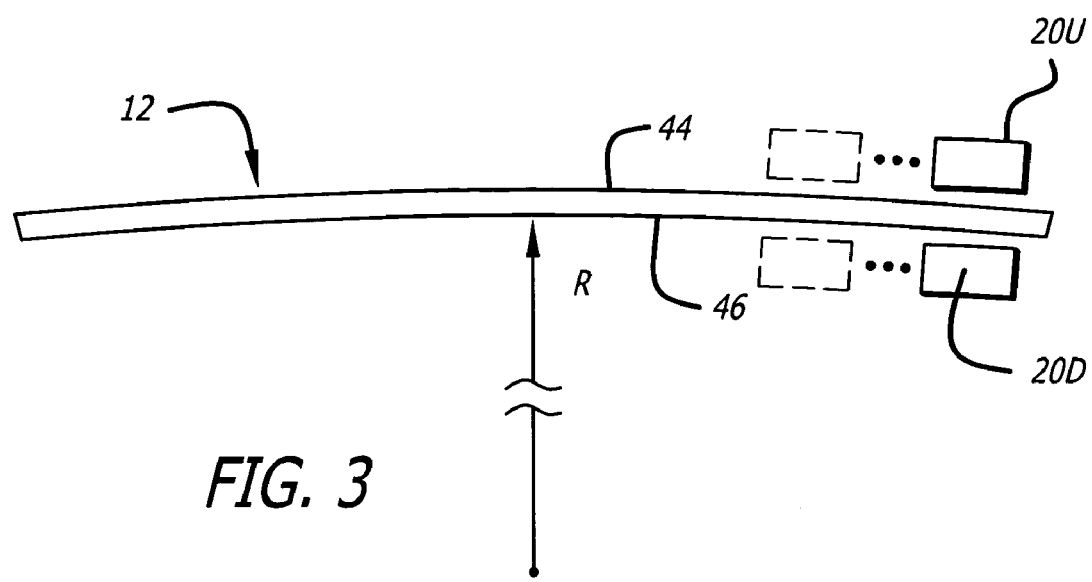
FIG. 3 is a side view showing an UP head and a DN head relative to a disk that has a crown.

FIG. 3 shows an up ("UP") head 20U that moves across a first surface 44 of a disk 12 and a down ("DN") head 20D that moves across a second surface 46 of the disk 12. The disk 12 may have a radial crown having a radius of curvature R and a radial camber (not shown). The crown and camber may vary the flying height of the UP head 20U and the DN heads 20D of the prior art in accordance with the following equations:

$$\Delta FH = \alpha_{crown} \frac{L^2}{8} \frac{1}{r} \frac{\partial z(r)}{\partial r} + \alpha_{camber} \frac{W^2}{8} \frac{\partial^2 z(r)}{\partial r^2}, \text{ for UP head} \qquad (1)$$

$$\Delta FH = -\alpha_{crown} \frac{L^2}{8} \frac{1}{r} \frac{\partial z(r)}{\partial r} - \alpha_{camber} \frac{W^2}{8} \frac{\partial^2 z(r)}{\partial r^2}, \text{ for DN head} \qquad (2)$$

Where;

$\Delta FH$=is the change in flying height.

$\partial_{crown}$=the head crown sensitivity due to the crown of the disk.

$\partial_{camber}$=the head camber sensitivity due to the camber of the disk.

L=the length of the head.

W=the width of the head.

z(r)=the radial position of the head on the disk.

r=radius of the disk.

The air bearing surfaces of the heads 20U and 20D are designed so that if moved across a flat surface the heads would produce a varying flying height h in accordance with the following equations:

$$h(r) = h - \alpha_{crown}\frac{L^2}{8}\frac{1}{r}\frac{\partial z(r)}{\partial r} - \alpha_{comber}\frac{W^2}{8}\frac{\partial^2 z(r)}{\partial r^2}, \text{ for UP head} \quad (3)$$

$$h(r) = h + \alpha_{crown}\frac{L^2}{8}\frac{1}{r}\frac{\partial z(r)}{\partial r} + \alpha_{comber}\frac{W^2}{8}\frac{\partial^2 z(r)}{\partial r^2}, \text{ for DN head} \quad (4)$$

Figure 4:
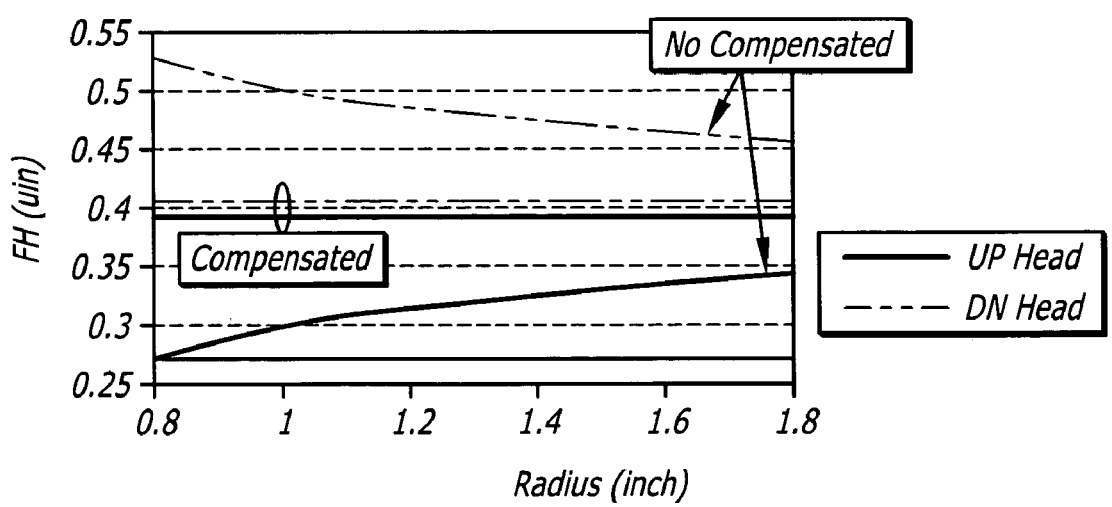
FIG. 4 is a graph showing a comparison between a head that compensates for a radial crown and camber of a disk to a head of the prior art.

The air bearing surfaces are designed to have crown and camber sensitivities that are opposite to the sensitivities shown in equations (1) and (2). The opposite signs of the sensitivities in equations (1) and (3) offset and result in an UP head 20U that has a constant flying height at each radial position of the disk z(r). Likewise, the opposite signs of the sensitivities in equations (2) and (4) offset, and result in a DN head 20D that has a constant flying height at each radial position of the disk z(r). FIG. 4 graphically shows the varying flying height for a head of the prior art and the constant flying height produced by a head with opposite signed sensitivities.

Figure 5:
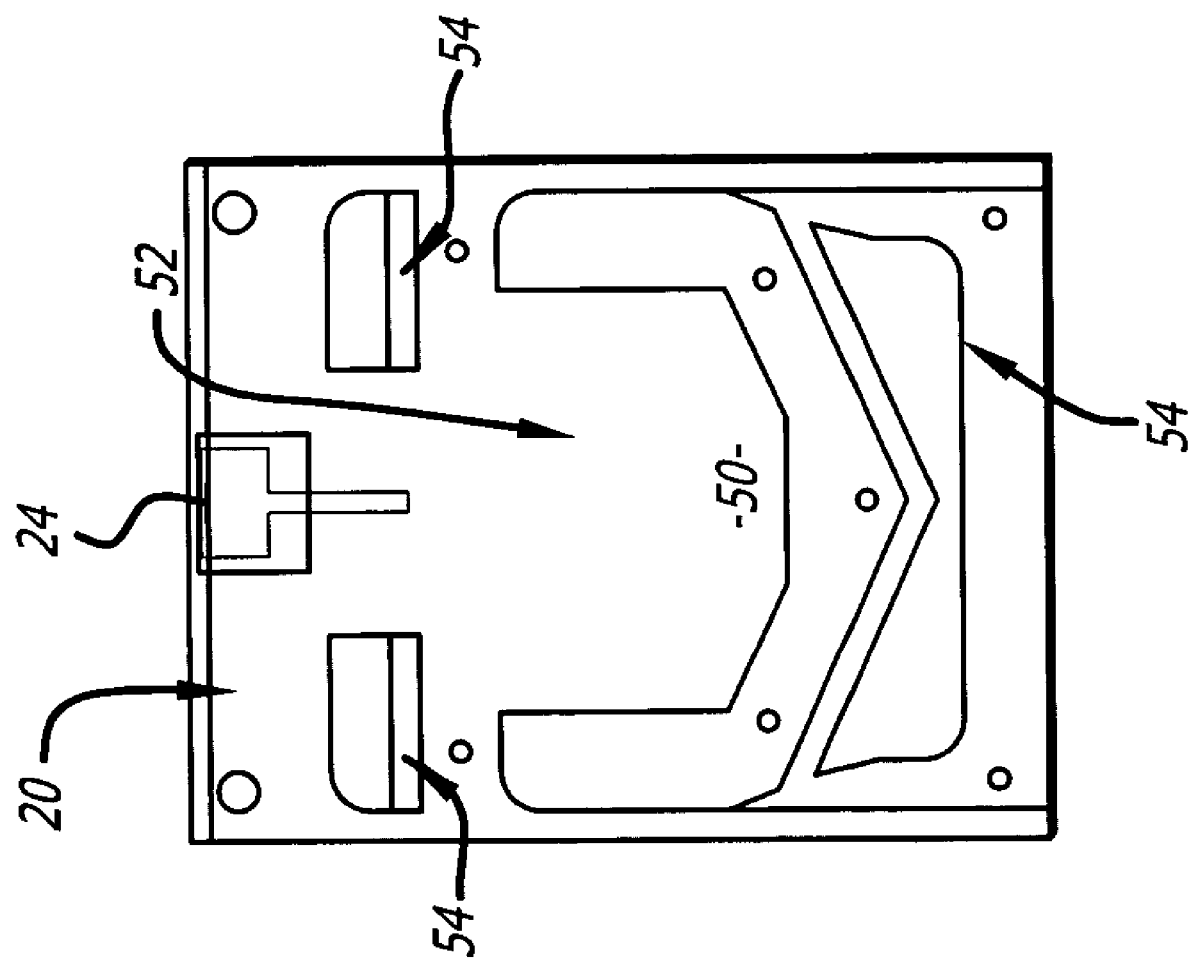
FIG. 5 is a bottom view of an embodiment of a head.

FIG. 5 shows an embodiment of an air bearing surface 50 of a head 20. The air bearing surface 50 may include a main recess portion 52 and shallow recess portions 54. Table 1 provides exemplary design parameters for a head that compensates for disk crown and camber in accordance with equations (3) and (4).

TABLE I

| PARAMETERS | Target Dim |
|---|---|
| Load Gram (g) | 3.00 |
| Pitch Offset (mil) | 0.00 |
| Roll Offset (mil) | 0.00 |
| Static Pitch (deg) | 0.00 |
| Static Roll (deg) | 0.00 |
| Total Crown (pin) | 0.59 |
| Cross Crown (pin) | 0.00 |
| Twist Height (pin) | 0.00 |
| Main Recess (pin) | 80.00 |
| Shallow Recess (pin.) | 5.60 |
| Mask Shift | 0.00 |
| Alumina Recess pin | 0.10 |
| PDLC Height (A) | 300.00 |

Figure 6:
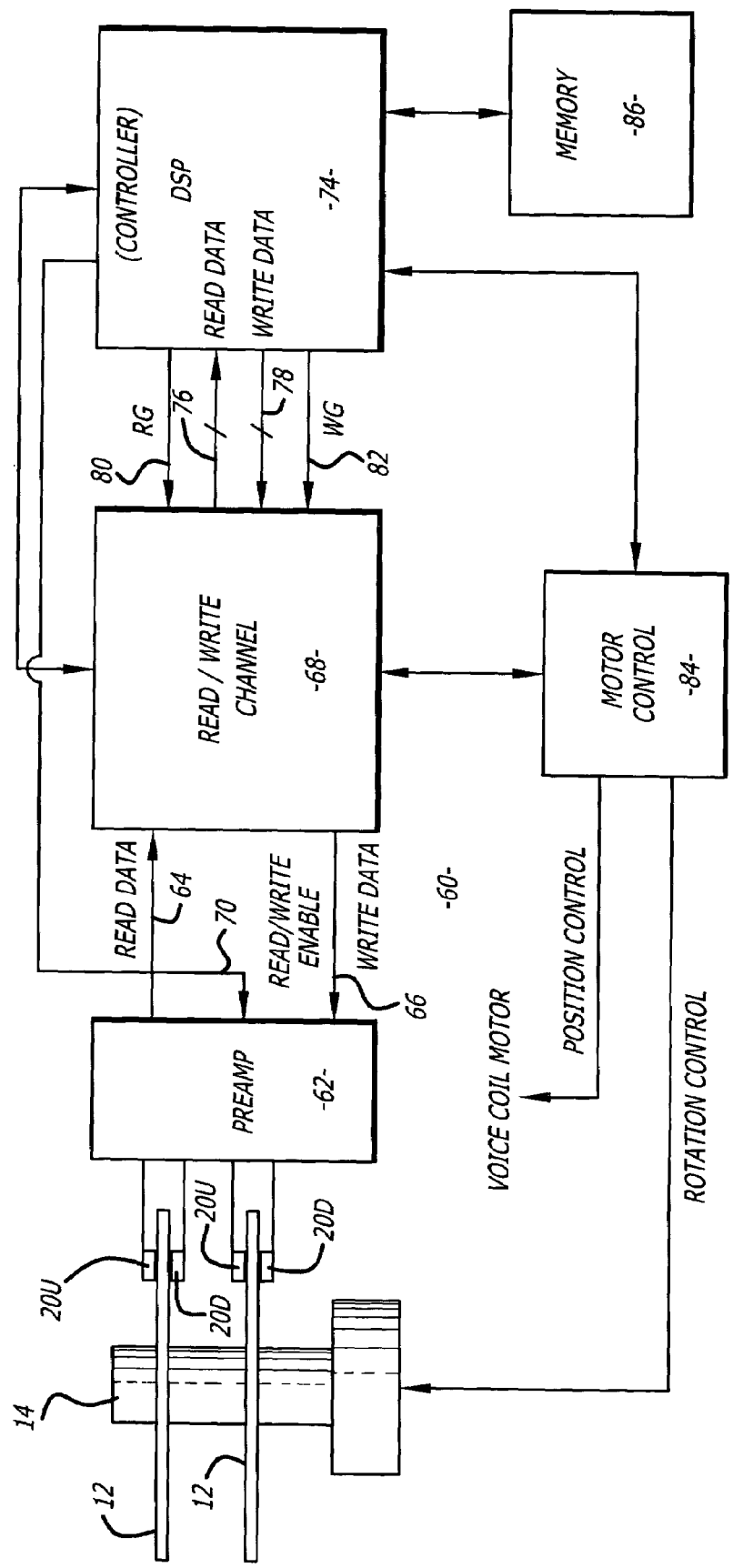
FIG. 6 is a schematic of an electrical circuit for the hard disk drive.

FIG. 6 shows an electrical circuit 60 of the disk drive 10 for reading and writing data onto the disks 12. The circuit 60 may include a pre-amplifier circuit 62 that is coupled to the heads 20. The pre-amplifier circuit 62 has a read data channel 64 and a write data channel 66 that are connected to a read/write channel circuit 68. The pre-amplifier 62 also has a read/write enable gate 70 connected to a controller 74. Data can be written onto the disks 12, or read from the disks 12 by enabling the read/write enable gate 70.

The read/write channel circuit 72 is connected to a controller 74 through read and write channels 76 and 78, respectively, and read and write gates 80 and 82, respectively. The read gate 80 is enabled when data is read from the disks 12. The write gate 82 is enabled when writing data to the disks 12. The controller 74 may be a digital signal processor that operates in accordance with a software routine, including a routine(s) to write and read data from the disks 12. The read/write channel circuit 68 and controller 74 may also be connected to a motor control circuit 84 which controls the voice coil motor 36 and spindle motor 14 of the disk drive 10. The controller 74 may be connected to a non-volatile memory device 86. By way of example, the device 86 may be a read only memory ("ROM"). The non-volatile memory 86 may contain the instructions to operate the controller and disk drive. Alternatively, the controller may have embedded firmware to operate the drive.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
a disk that has a radial crown and a radial camber across a surface;
a spindle motor that spins said disk and creates a flow of air;
a head coupled to said surface of said disk, said head having an air bearing surface that creates an air bearing with a flying height, said air bearing surface compensates an effect of said radial crown and said radial camber of said disk to maintain said flying height of said head across said disk surface, said air bearing surface creates a flying height across a flat disk surface in accordance with the following equation:

$$h(r) = h - \alpha_{crown}\frac{L^2}{8}\frac{1}{r}\frac{\partial z(r)}{\partial r} - \alpha_{comber}\frac{W^2}{8}\frac{\partial^2 z(r)}{\partial r^2},$$

for UP head
Where:
h=the original flying height;
h(r)=the new flying height;
$\partial_{crown}$=the head crown sensitivity due to the crown of the disk;
$\partial_{camber}$=the head camber sensitivity due to the camber of the disk:
L=the length of the head;
W=the width of the head;
z(r)=the radial position of the head on the disk;
r=radius of the disk;
an actuator arm coupled to said head;
a voice coil motor coupled to said actuator arm; and,
a controller coupled to said head.

2. A hard disk drive, comprising:
a disk that has a radial crown and a radial camber across a surface;
a spindle motor that spins said disk and creates a flow of air;
a head coupled to said surface of said disk, said head having air bearing surface means for creating an air bearing with a flying height and compensating for an effect of said radial crown and said radial camber of said disk to maintain said flying height of said head across said disk surface, said air bearing surface means creates a flying height across a flat disk surface in accordance with the following equation:

$$h(r) = h + \alpha_{crown}\frac{L^2}{8}\frac{1}{r}\frac{\partial z(r)}{\partial r} + \alpha_{comber}\frac{W^2}{8}\frac{\partial^2 z(r)}{\partial r^2},$$

for UP head

Where:
h=the original flying height;
h(r)=the new flying height;
$\partial_{crown}$=the head crown sensitivity due to the crown of the disk;
$\partial_{camber}$=the head camber sensitivity due to the camber of the disk;
L=the length of the head;
W=the width of the head;
z(r)=the radial position of the head on the disk;
r=radius of the disk;
an actuator arm coupled to said head;
a voice coil motor coupled to said actuator arm; and,
a controller coupled to said head.

3. A head for a hard disk drive, comprising:
a head that has an air bearing surface that creates a flying height of an air bearing across a flat disk surface in accordance with the following equation:

$$h(r) = h - \alpha_{crown}\frac{L^2}{8}\frac{1}{r}\frac{\partial z(r)}{\partial r} - \alpha_{comber}\frac{W^2}{8}\frac{\partial^2 z(r)}{\partial r^2},$$

for UP head
Where:
h=the original flying height;
h(r)=the new flying height;
$\partial_{crown}$=the head crown sensitivity due to the crown of the disk;
$\partial_{camber}$=the head camber sensitivity due to the camber of the disk;
L=the length of the head;
W=the width of the head;
z(r)=the radial position of the head on the disk;
r=radius of the disk.

4. A head for a hard disk drive, comprising:
a head that has an air bearing surface that creates a flying height of an air bearing across a disk surface in accordance with the following equation:

$$h(r) = h + \alpha_{crown}\frac{L^2}{8}\frac{1}{r}\frac{\partial z(r)}{\partial r} + \alpha_{comber}\frac{W^2}{8}\frac{\partial^2 z(r)}{\partial r^2},$$

for DN head
Where:
h=the original flying height;
h(r)=the new flying height;
$\partial_{crown}$=the head crown sensitivity due to the crown of the disk;
$\partial_{camber}$=the head camber sensitivity due to the camber of the disk;
L=the length of the head;
W=the width of the head;
z(r)=the radial position of the head on the disk;
r=radius of the disk.

5. A head for a hard disk drive, comprising:
a head that has air bearing surface means for creating a flying height of an air bearing across a flat disk surface in accordance with the following equation:

$$h(r) = h - \alpha_{crown}\frac{L^2}{8}\frac{1}{r}\frac{\partial z(r)}{\partial r} - \alpha_{comber}\frac{W^2}{8}\frac{\partial^2 z(r)}{\partial r^2},$$

for UP head
Where:
h=the original flying height;
h(r)=the new flying height;
a crown=the head crown sensitivity due to the crown of the disk;
a camber=the head camber sensitivity due to the camber of the disk;
L=the length of the head;
W=the width of the head;
z(r)=the radial position of the head on the disk;
r=radius of the disk.

6. A head for a hard disk drive, comprising:
a head that has air bearing surface means for creating a flying height of an air bearing across a flat disk surface in accordance with the following equation:

$$h(r) = h + \alpha_{crown}\frac{L^2}{8}\frac{1}{r}\frac{\partial z(r)}{\partial r} + \alpha_{comber}\frac{W^2}{8}\frac{\partial^2 z(r)}{\partial r^2},$$

for DN head
Where:
h=the original flying height;
h(r)=the new flying height;
$\partial_{crown}$=the head crown sensitivity due to the crown of the disk;
$\partial_{camber}$=the head camber sensitivity due to the camber of the disk;
L=the length of the head;
W=the width of the head;
z(r)=the radial position of the head on the disk;
r=radius of the disk.

7. A method for moving a head across a disk of a hard disk drive, the disk having a radial crown and a radial camber, the head having an air bearing surface that cooperates with an air flow to create an air bearing that has a flying height, comprising:
moving a head across the disk so that the flying height is essentially constant across the disk, wherein the air bearing surface maintains the flying height of the air bearing across a flat disk surface in accordance with the following equation:

$$h(r) = h - \alpha_{crown}\frac{L^2}{8}\frac{1}{r}\frac{\partial z(r)}{\partial r} - \alpha_{comber}\frac{W^2}{8}\frac{\partial^2 z(r)}{\partial r^2},$$

for UP head
Where:
h=the original flying height;
h(r)=the new flying height;
$\partial_{crown}$=the head crown sensitivity due to the crown of the disk;
$\partial_{camber}$=the head camber sensitivity due to the camber of the disk;
L=the length of the head;
W=the width of the head;
z(r)=the radial position of the head on the disk;
r=radius of the disk.

8. A hard disk drive, comprising:
a disk that has a radial crown and a radial camber across a surface;
a spindle motor that spins said disk and creates a flow of air;

a head coupled to said surface of said disk, said head having an air bearing surface that creates an air bearing with a flying height, said air bearing surface compensates an effect of said radial crown and said radial camber of said disk to maintain said flying height of said head across said disk surface, said air bearing surface creates a flying height across a flat disk surface in accordance with the following equation:

$$h(r) = h + \alpha_{crown}\frac{L^2}{8}\frac{1}{r}\frac{\partial z(r)}{\partial r} + \alpha_{comber}\frac{W^2}{8}\frac{\partial^2 z(r)}{\partial r^2},$$

for DN head

Where:

h=the original flying height;

h(r)=the new flying height;

$\partial_{crown}$=the head crown sensitivity due to the crown of the disk;

$\partial_{camber}$=the head camber sensitivity due to the camber of the disk;

L=the length of the head;

W=the width of the head;

z(r)=the radial position of the head on the disk;

r=radius of the disk.

9. A hard disk drive, comprising;

a disk that has a radial crown and a radial camber across a surface;

a spindle motor that spins said disk and creates a flow of air;

a head coupled to said surface of said disk, said head having air bearing surface means for creating an air bearing with a flying height and compensating for an effect of said radial crown and said radial camber of said disk to maintain said flying height of said head across said disk surface, said air bearing surface means creates a flying height across a flat disk surface in accordance with the following equation;

$$h(r) = h - \alpha_{crown}\frac{L^2}{8}\frac{1}{r}\frac{\partial z(r)}{\partial r} - \alpha_{camber}\frac{W^2}{8}\frac{\partial^2 z(r)}{\partial r^2},$$

for DN head

Where:

h=the original flying height;

h(r)=the new flying height $\partial_{crown}$=the head crown sensitivity due to the crown of the disk;

$\partial_{camber}$=the head camber sensitivity due to the camber of the disk;

L=the length of the head;

W=the width of the head;

z(r)=the radial position of the head on the disk;

r=radius of the disk;

an actuator arm coupled to said head;

a voice coil motor coupled to said actuator arm; and, a controller coupled to said head.

10. A method for moving a head across a disk of a hard disk drive, the disk having a radial crown and a radial camber, the head having an air bearing surface that cooperates with an air flow to create an air bearing that has a flying height, comprising;

moving a head across the disk so that the flying height is essentially constant across the disk, wherein the air bearing surface maintains the flying height of the air bearing across a flat disk surface in accordance with the following equation;

$$h(r) = h + \alpha_{crown}\frac{L^2}{8}\frac{1}{r}\frac{\partial z(r)}{\partial r} + \alpha_{camber}\frac{W^2}{8}\frac{\partial^2 z(r)}{\partial r^2},$$

for DN head

Where:

h=the original flying height;

h(r)=the new flying height;

$\partial_{crown}$=the head crown sensitivity due to the crown of the disk;

$\partial_{camber}$=the head camber sensitivity due to the camber of the disk;

L=the length of the head;

W=the width of the head;

z(r)=the radial position of the head on the disk;

r=radius of the disk.

* * * * *